(12) United States Patent
Suteau

(10) Patent No.: US 7,889,424 B2
(45) Date of Patent: Feb. 15, 2011

(54) COLLAPSING PROJECTION SCREEN CONSISTING OF A REFLECTING FABRIC RETRACTED IN A BOX BEHIND A WALL DECORATION

(75) Inventor: Eric Claude Suteau, Monnaie (FR)

(73) Assignee: D.S.H.D (Design Screen Haute Definition), Monnaie (FR)

( * ) Notice: Subject to any disclaimer, the term of this patent is extended or adjusted under 35 U.S.C. 154(b) by 681 days.

(21) Appl. No.: 11/722,024

(22) PCT Filed: Dec. 14, 2005

(86) PCT No.: PCT/FR2005/003129

§ 371 (c)(1),
(2), (4) Date: Oct. 15, 2007

(87) PCT Pub. No.: WO2006/067304

PCT Pub. Date: Jun. 29, 2006

(65) Prior Publication Data

US 2009/0268285 A1   Oct. 29, 2009

(30) Foreign Application Priority Data

Dec. 17, 2004  (FR) .................................. 04 13490

(51) Int. Cl.
*G03B 21/56* (2006.01)
(52) U.S. Cl. ..................... 359/443; 160/377
(58) Field of Classification Search .............. 359/443, 359/461; 160/377
See application file for complete search history.

(56) References Cited

U.S. PATENT DOCUMENTS

| 2,827,955 A * | 3/1958 | Hurley ................. 160/369 |
| 5,570,495 A * | 11/1996 | Mogell ................. 29/428 |
| 6,466,369 B1 * | 10/2002 | Maddock .............. 359/460 |
| 7,397,603 B2 * | 7/2008 | Peterson et al. ......... 359/443 |
| 2003/0123032 A1 | 7/2003 | Rodriguez, Jr. |

FOREIGN PATENT DOCUMENTS

| EP | 0 742 475 A2 | 11/1996 |
| JP | 9-230503 | 9/1997 |
| JP | 9-230504 | 9/1997 |

* cited by examiner

*Primary Examiner*—Christopher Mahoney
(74) *Attorney, Agent, or Firm*—Oblon, Spivak, McClelland, Maier & Neustadt, L.L.P.

(57) ABSTRACT

A device for folding a reflective projection sheet, including a wall decoration including a box placed behind it, a device inside the box opening out to form a three-portion device including a first panel, a second panel, and a central false back that advances into alignment with the first and second panels when open and/or that reverses to the back of the box, a reflective projection sheet tensioned over the panels and the false back so that the sheet deploys and is tensioned when the first and second panels are open, and folds over into three portions without leaving any fold marks when the first and second panels are closed. The device presents dimensions that are relatively small, because of the way the panels fold, and does so without leaving fold marks on the sheets. The device can discreetly integrate a front projection sheet for video projectors.

30 Claims, 6 Drawing Sheets

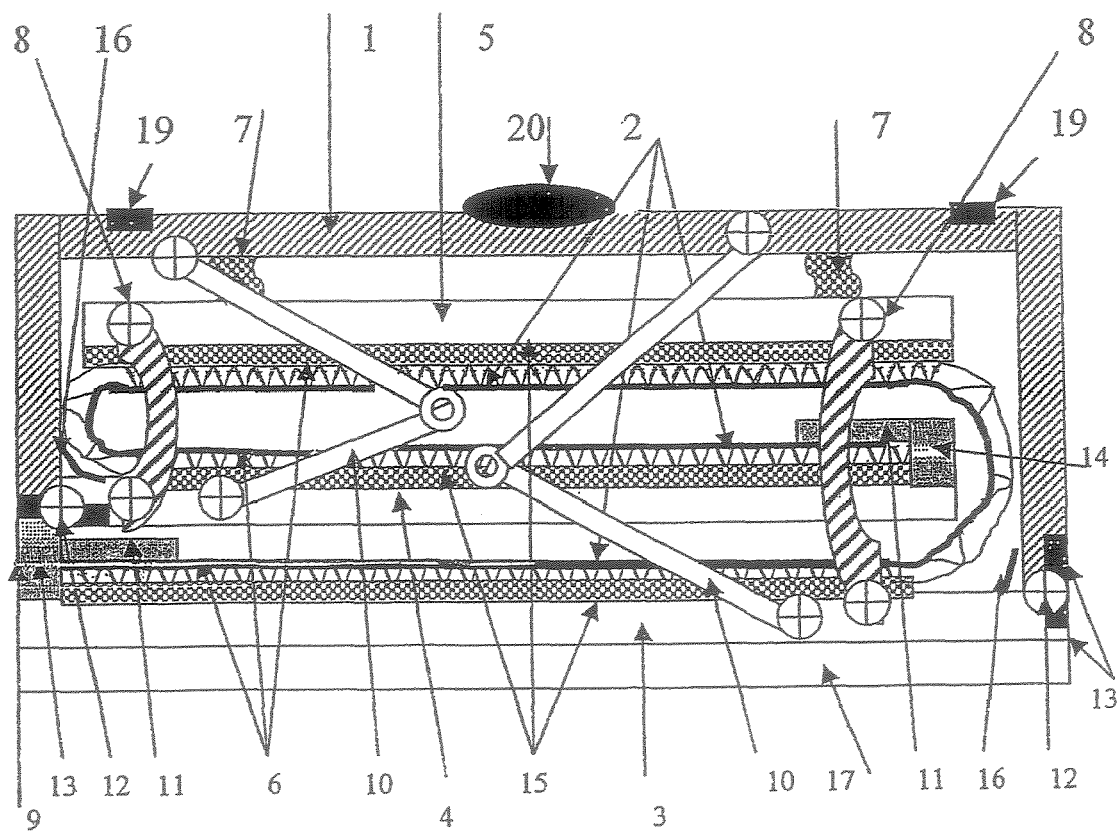
FIG 4 Bis

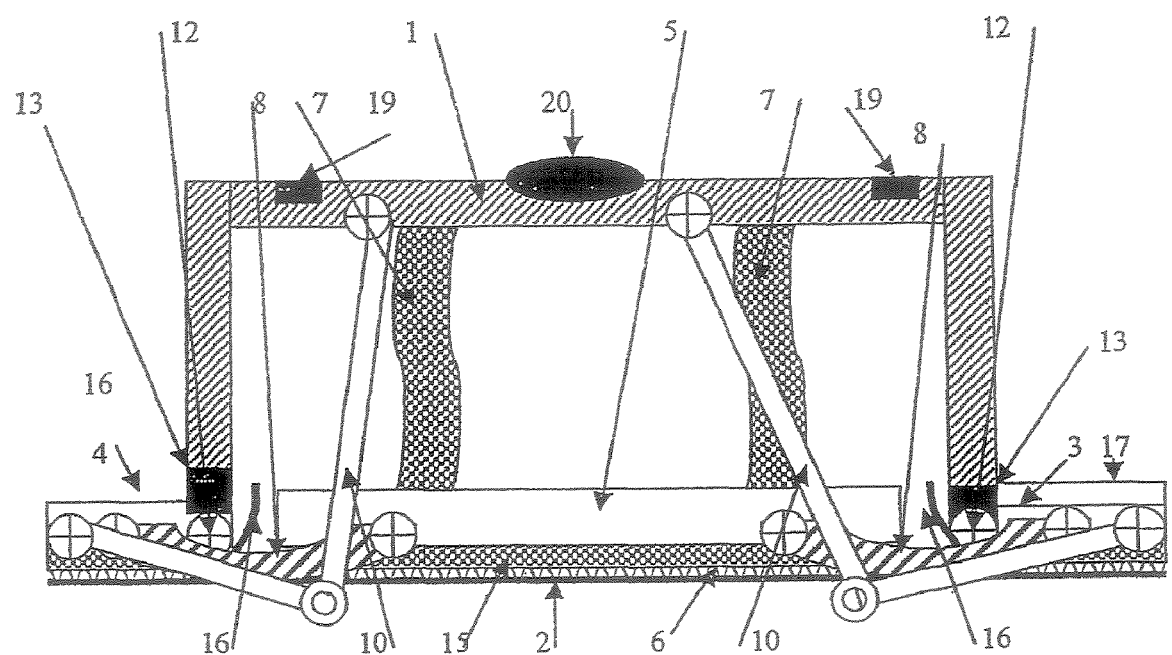
FIG.5bis

COLLAPSING PROJECTION SCREEN CONSISTING OF A REFLECTING FABRIC RETRACTED IN A BOX BEHIND A WALL DECORATION

FIELD OF THE INVENTION

The present invention relates to a device for folding a reflective projection sheet and integrating it behind wall decoration, and it relates more particularly to a device enabling a home cinema projection sheet to be folded and unfolded in three portions so as to reduce its size, but without making permanent fold marks therein.

DISCUSSION OF THE BACKGROUND

The use of video projectors designed specifically for home cinema applications is becoming more widespread in homes but such video projectors need a reflective projection sheet that is adapted to front projection. The projection sheet must thus be non-translucent without the slightest fold, and under the highest possible tension and until now these requirements have made it impossible to fold such an opaque reflective sheet without leaving fold marks that spoil the quality of the front projected image from such a video projector.

Front projection sheets for video projectors are either rolled along their long dimension within motor-driven or manual roll-up cases or else they are tensioned on a fixed frame of length equal to the base of the screen. That occupies a very large horizontal space on the wall of a home where such a sheet has been installed.

Some projection sheets are improved by a tensioning device seeking to make the sheets more plane while they are in use. However the tensioning device further increases the horizontal size of such screens, and on the contrary makes it even more difficult to integrate them discreetly on the wall of a home.

Some devices enable a back projection screen to be folded so as to make it transportable and capable of being installed quickly in front of a professional or school auditorium, however those devices apply only to translucent screens for projection from behind, and not to reflective screens for front projection. Thus, devices of that type exist only for professional or school applications and they are not sought out by people seeking to set up a private home cinema based on a video projector.

Other devices enable a support or stand for a screen to be folded, but not the reflective sheet for front projection itself.

Other devices enable a translucent screen to be folded into a box for placing on a horizontal support during traveling professional or school utilizations, but no device enables a reflective sheet to be integrated and folded behind wall decoration for home use, without leading to irreversible damage to the sheet.

The following patent documents illustrate such devices and are representative of the present state of the art:

EP-A2-0 085 527 relating to the construction of a projection screen;

EP-A1-0 631 174, describing a giant screen with a hinge for an open air showing;

WO 97/09853 relating to presentation screens fitted with loudspeakers;

EP-A1-1 233 300 relating to a projection screen with a support;

WO 03/100519, relating to a self-contained screen that is unfolded manually;

U.S. Pat. No. 6,466,369, relating to a portable display device with a folding screen; and WO 2004/027515 describing a wall screen that can be rolled up and unrolled.

SUMMARY OF THE INVENTION

The device of the invention makes it possible to remedy those drawbacks. It comprises a frame or any other wall ornament of similar type, such as, in non-limiting manner: clip-frame, a picture, a mirror, or a board, e.g. a magnetized board for photographs or a notice board, with a box located behind it.

More precisely, the present invention provides a device for folding a reflective projection sheet, the device comprises a wall decoration having a box placed behind it, a device inside the box opening out to form a three-portion triptych-like device comprising a first panel, a second panel, and a central false back that advances into alignment with said panels when open and/or that reverses to the back of said box, a reflective projection sheet being tensioned over the panels and the false back so that said sheet deploys and is tensioned when the two panels are open, and folds over into three portions without folding when the two panels are closed.

Thus, when the user opens both panels of the box, the central false back advances so that the right panel, the left panel, and the central false back are accurately aligned in a common plane, like a triptych. The reflective projection sheet is tensioned over the triptych and is thus unfolded over its entire length.

When the user closes the two panels of the box, the central false back reverses to the back of the box, moving the central portion of the projection sheet away from the two panels, which can therefore be closed in the space thus released. The reflective projection sheet is thus folded in three within the box, said three portions being spaced apart one in front of another, without leaving any fold marks or traces, and its overall size is thus reduced.

In particular embodiments of the present invention:
  the box possesses a first side on which the first panel is secured, and a second side on which the second panel is secured, the first side being deeper than the second side; and
  the second panel is narrower than the first panel so as to be capable of entering inside the box when closed.

Thus, the closed box is of dimensions such that the two panels, i.e. the right and left panels, do not close in the same plane, but one in front of the other while leaving an empty space between them. This is made possible by the right side of the box being deeper than the left side (or vice versa) and with the left panel being narrower than the right panel (or vice versa).

According to other characteristics of the present invention that are particularly advantageous:
  the first panel and the second panel are connected to the box via hinges spaced in such a manner that said panels do not close in a common plane but rather one in front of the other, leaving an empty space between them;
  the device further comprises means for facilitating opening and/or closing of at least one of the panels;
  the means for facilitating opening and/or closing of the panels comprise a hinged arm connecting each of the panels to the box;
  the panels and the false back are each provided with means for correcting their alignment so as to tension the reflective projection sheet in perfectly plane manner on said panels and on said false back when the device is in the fully-open position;

the alignment correcting means comprise battens of various thicknesses placed on the respective perimeters of each panel and/or of said false back;

the panels and the central false back, or their alignment-correcting battens are provided with fastening points for tensioning the front projection sheet;

the device further comprises a resilient return system such that the central false back over which the middle of the reflective projection sheet is tensioned advances automatically when the panels are open and reverses when they are closed, an empty space being provided between the central false back and the second panel placed in front of it;

the resilient return system is made up of a plurality of springs connecting the central false back to the box;

a fastener system connects the panels to the false back in such a manner as to move the false back automatically as a function of the opening and the closing of the panels;

the fastener system comprises a cable or else the fastener system comprises a fine flexible resilient metal sheet, which then also forms the resilient return means for the false back;

the central false back is provided with wheels to facilitate advancing and reversing inside the box when the panels are opened and closed;

the device also includes a fastener system for holding each panel in the open position and/or the closed position;

the fastener system comprises magnets fitted to one edge of each panel and to the corresponding edges of the box;

the first panel is provided with a first rim such that the perimeter of the box as a whole is fully closed when the device is closed;

the second panel is also provided with a rim substantially identical to the rim of the first panel;

the device further includes a resilient tensioning system secured to the reflective projection sheet so that said sheet is tensioned locally within the box on each panel and on the central false back;

the device also includes covers fastened to the inside end of each of the panels and juxtaposed on the rims of the panels so that the covers mask the system for tensioning the reflecting projection sheet when the device is open;

the inside corners of the panels are chamfered and covered by a protective system, e.g. of cloth, so as to protect the reflective projection sheet from any wear, in particular by rubbing;

the device further comprises a peripheral band of color that contrasts with the color of the projection sheet, said band being secured to the front face of the reflective sheet so as to locally reinforce the structure of the sheet, to accentuate the contrast of the image projected on the sheet, and to hide portions of the tensioning system;

an ornamental element comprising at least one of the following a frame, a poster cover, a picture, a mirror, or a board e.g. a magnetized board, is fastened on or constitutes the front face of the first panel so that the ornamental device constitutes or is supported by the decorative facade of the device as a whole when in the closed position;

the rear of the box is provided with a fixing system enabling it to be suspended from a wall like a picture;

the box is provided at its base with a removable stand system enabling the entire device to be placed on a table or a horizontal support; and the box is provided with a rear rotary shaft placed substantially in its middle and enabling said device to be hung from a wall and to be placed in a horizontal position, in a vertical position or in any intermediate inclined position by turning the box about said shaft.

BRIEF DESCRIPTION OF THE DRAWINGS

Other characteristics details and advantages of the invention appear on reading the following description made with reference to the accompanying drawings given by way of example and showing respectively:

FIG. 4*bis*, a plan view in section showing a variant of the device in the closed position, and on a larger scale;

FIG. 5*bis*, a plan view in section showing a variant of the device in the open position, and on a larger scale;

DESCRIPTION OF EXEMPLARY EMBODIMENTS

With reference to the accompanying figures, the device of the present invention for folding and unfolding a projection sheet 2 comprises a decorative wall ornament 17 behind which there is secured a rigid box 1, e.g. made of rigid and lightweight aluminum extrusions. The decorative ornament 17 may be selected by the user, in particular from a frame, a clip-frame, a picture, a mirror, or a board, e.g. a magnetic board, depending on the user's taste, the location of the device (bedroom, living room, projection room), the surrounding lighting, the use of the device when in its closed position, or indeed the furniture nearby in order to harmonize therewith. For this purpose, various finishes may be proposed for the portion of the device that is visible in its closed position, e.g. an aluminum finish and/or a wood veneer.

Figure 1:
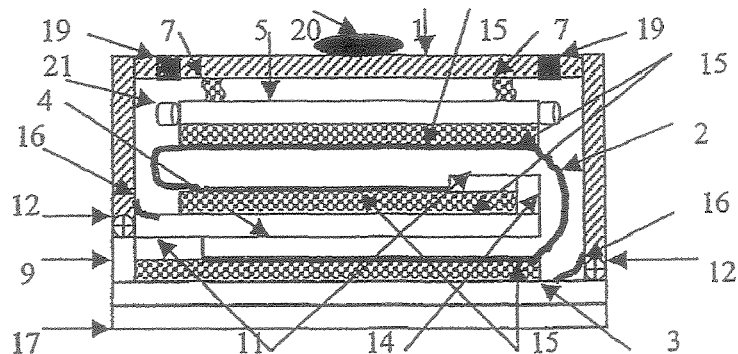
FIG. 1, a plan view in section showing a device in accordance with the present invention in simplified manner and in the closed position.
Figure 2:
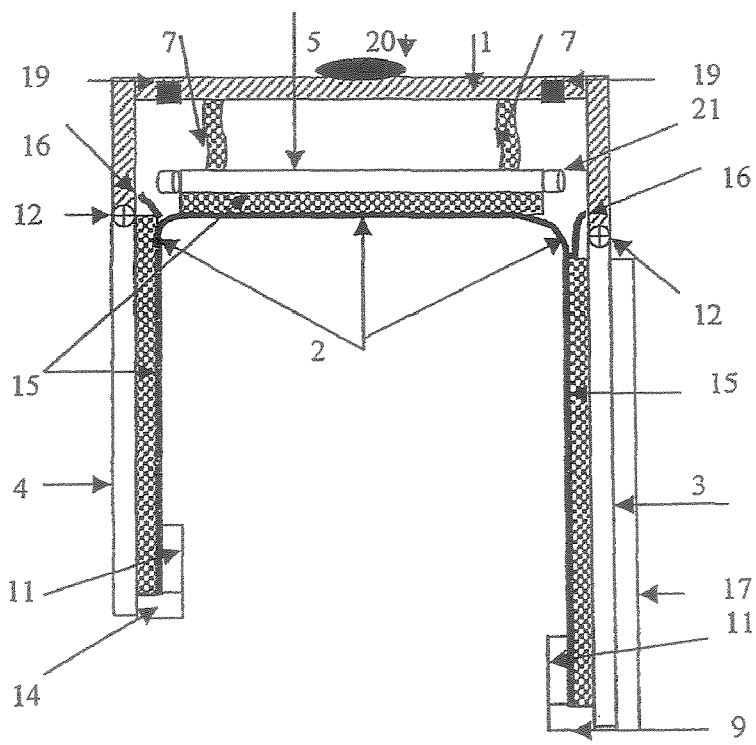
FIG. 2, a plan view in section showing the FIG. 1 device in a half-open position.
Figure 4:
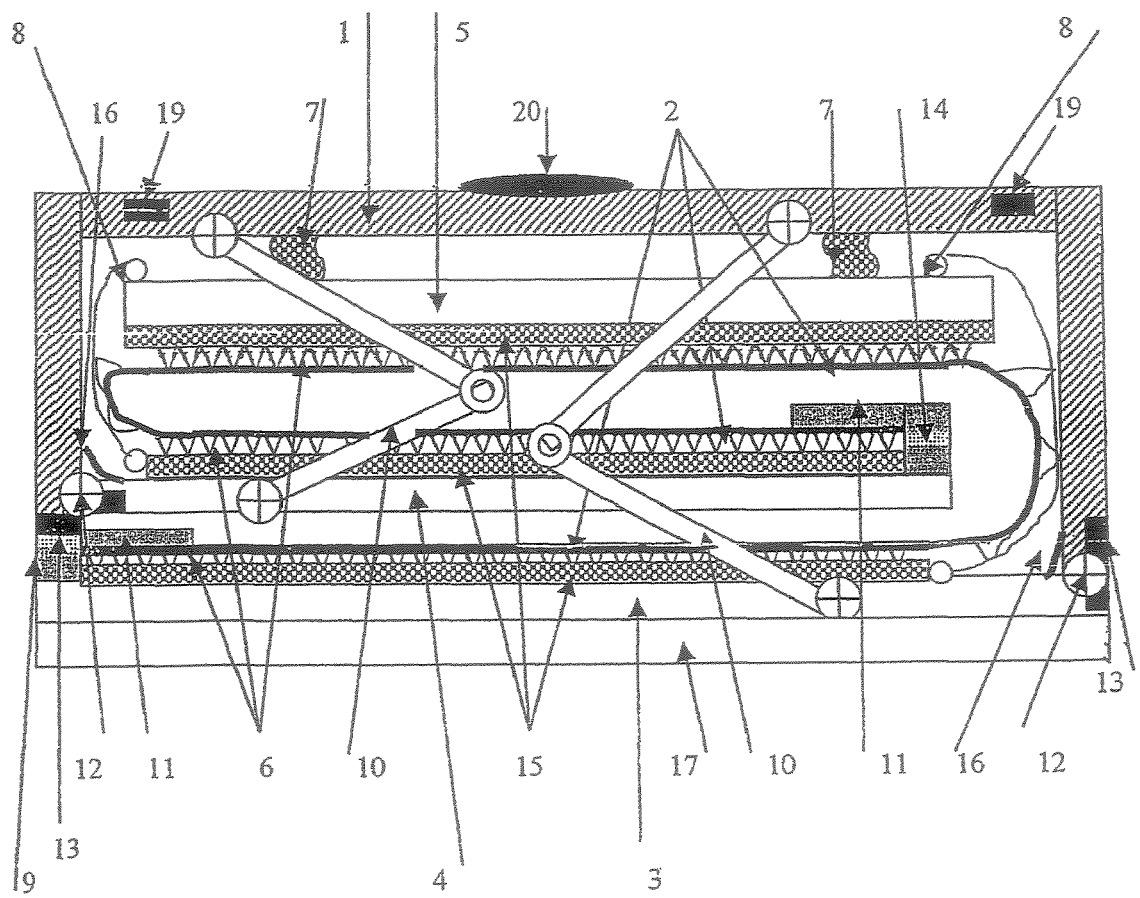
FIG. 4, a plan view in section showing the device in the closed position on a larger scale.

The box 1 is provided with a first panel 3 referred to as the right panel, and a second panel 4, referred as the left panel, said panels being connected to the box via vertically-aligned hinges 12, typically three hinges per panel. The right panel 3 itself constitutes the wall ornament 17, or supports the ornament by any appropriate fastener means. As can be seen in FIGS. 1, 4, and 4*bis*, the sides of the box 1 are of different depths such that, in the closed position, the panels close one over the other, leaving an empty space between them, the left panel being also narrower than the right panel.

Hinged arms 10 are fastened between each panel and the false back of the box 1 to facilitate and assist opening the panels and closing them, as shown in FIGS. 4, 4*bis*, 5, and 5*bis*. Typically, these arms 10 are situated at the top and bottom edges of each of the panels.

Substantially in its center, the box 1 contains a moving false back 5 that is connected to the box by a resilient return system 7 tending to urge the false back 5 towards the back of the box 1, and causing it to slide rectilinearly from front to back, and vice versa, within the box 1.

In the embodiment shown, the false back 5 slides within the box on wheels 21 shown diagrammatically in particular in FIG. 1, e.g. co-operating with rails (not shown).

Figure 3:
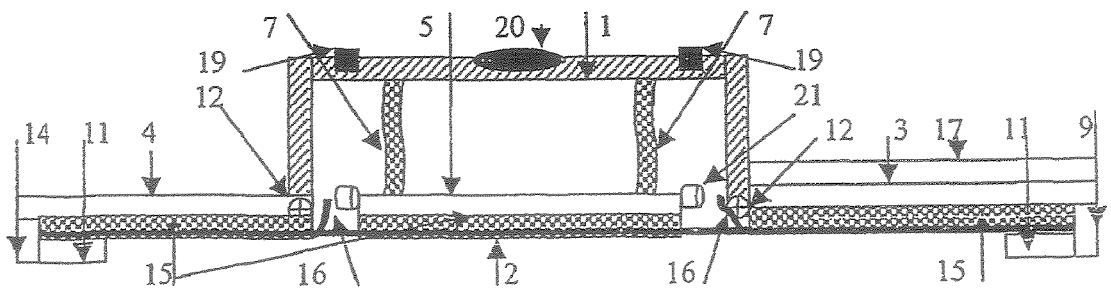
FIG. 3, a plan view in section showing the FIG. 1 device in a fully-open position.
Figure 5:
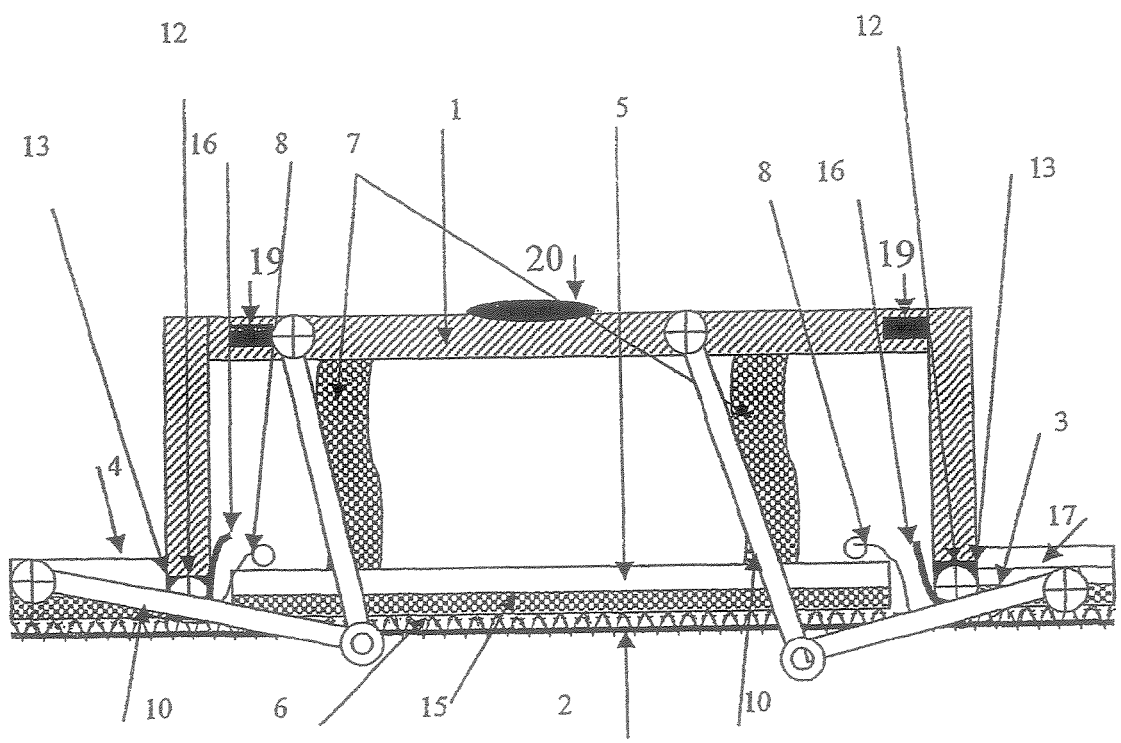
FIG. 5, a plan view in section showing the device in the open position, and on a larger scale.
Figure 6:
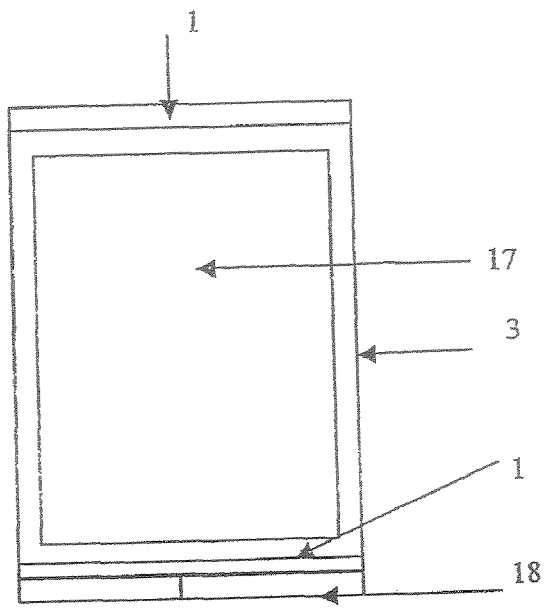
FIG. 6, a face view of the device in the closed position.

The false back 5 is also connected to the two panels 3 and 4 by a system of fastening cables 8 such that opening the two panels pulls the false back 5 forwards within the box 1 until the false back lies accurately in alignment with the two open panels, i.e. in the same plane, as shown in FIGS. 3, 5, and 5bis. This linkage thus enables the false back 5 to be moved forwards automatically when the panels are opened.

Each of the two panels 3 and 4 has a magnetic fastener system 13 enabling the panels to be held open while the device is in use, so as to ensure that the assembly constituted by the panels and the false back 5 remains plane.

The box 1 also has a vertical rim 9 situated at the inside end of the right panel 3 and serving to close the side of the box 1 when in the closed position, thereby improving its appearance and preventing dust from penetrating that could otherwise fall on the sheet or prevent the panels from opening and closing.

For reasons of symmetry and appearance, particularly when the device is fully open, an identical vertical rim 14 is fitted likewise to the inside end of the left panel 4.

The rim 9 or the end of the right panel 3 itself includes another magnetic fastener system that co-operates with the fastener system 13 so as to hold the box in the closed position when it is not in use.

Each of the two panels 3 and 4 has a lateral protection device in the form of a cloth cover 16 for overlying the hinges 12 and preventing any wear by rubbing against other portions of the device, in particular the reflective projection sheet 2, during repeated operations of opening and closing the panels 3 and 4.

The two panels 3 and 4 and also the central false back 5 are provided with respective battens 15 of different thicknesses in order to compensate where necessary, for their alignment in the depth direction and to keep the reflective sheet away from the hinges 12 of the two panels. These battens 15, or directly the two panels 3 and 4 and the central false back 5 are fitted with or comprise a fastener system enabling the reflective projection sheet 2 to be suspended and tensioned.

The inside corners of the two panels 3 and 4 are preferably chamfered so as to avoid damaging the front projection sheet 2 by rubbing in contact therewith.

The reflective projection sheet 2 is positioned within the box in such a manner as to be locally tensioned on the right panel 3, on the left panel 4, and on the false back 5 with the help of a resilient tensioning system 6 or biding extending over the perimeter of said sheet and serving to tension it when the device is open. The resilient tensioning system 6 is preferably hidden from the eyes of the user by two covers 11 situated respectively at the ends of the right and left panels 3 and 4.

The front projection sheet 2 is reinforced at its perimeter by strips 18 of color contrasting with the color of the sheet, for example black strips made of a fabric such as baize. Together these strips form a band serving both to reinforce the structure of the projection sheet 2 locally, to accentuate the contrast of the image being projected onto the sheet, and to improve the overall appearance of the device in the open position in particular by hiding portions of the tensioning device 6.

Alternatively, the device is mounted on a rear rotary shaft 20 enabling the user to pivot it in order to place it in a horizontal position on the wall while it is not in use, as shown in FIGS. 1 to 5bis. This configuration can serve, for example, to include a landscape format picture on the front face of the right panel 3.

At the rear of the box 1, the device also includes a wall fixing system 19 constituted by hooks or perforated locations enabling the user to hang it on the wall like a picture, as shown in FIGS. 1 to 5bis.

Figure 7:
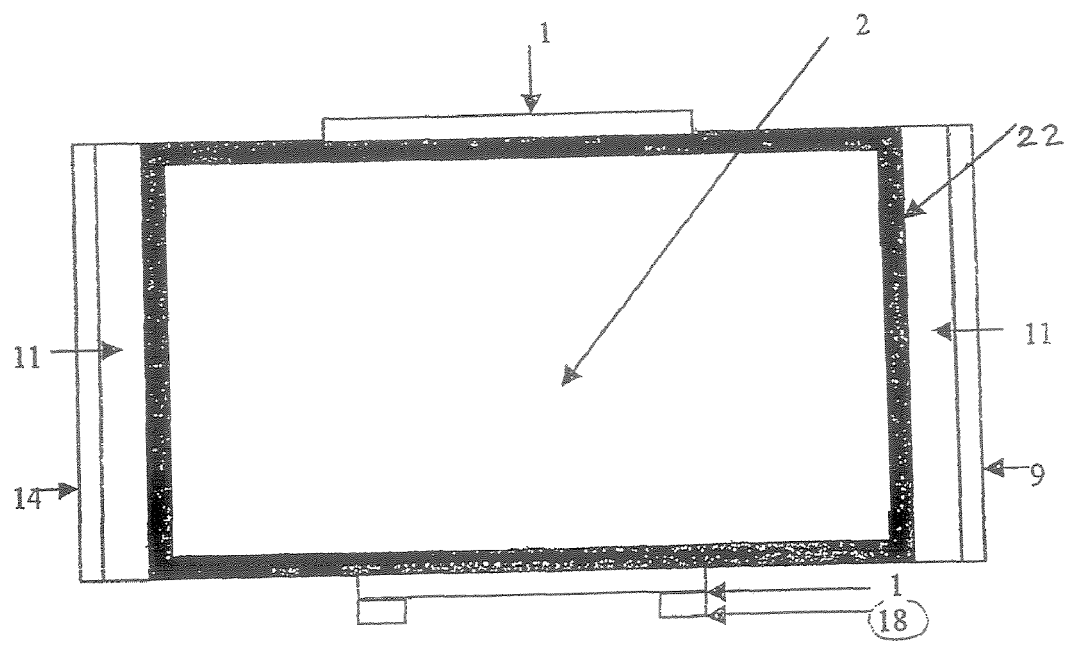
FIG. 7, a face view of the device in the open position.

The device may also include a removable stand system 18 enabling the user to place it on a table or any other selected horizontal support while it is in use, after taking it down from the wall, as shown in FIG. 7.

As a non-limiting example, the device, once open, presents dimensions such that its ratio of width over height is substantially equal to 16/9, i.e. the format that is the most widespread in home cinema projection matters. Thus the screen constituted by the reflective projection sheet 2 tensioned over the panels and the false back could present one of the following common formats:

210 cm wide by 105 cm high. In this format, the box 1 presents a width of about 72 cm, a height of 105 cm, and a thickness of 12 cm; or 280 cm wide by 122 cm high. In this format, the box 1 presents a width of about 83 cm, a height of 122 cm, and a thickness of 12 cm; or 280 cm wide by 145 cm high. In this format, the box 1 presents a width of about 147 cm, a height of 145 cm, and a thickness of 12 cm.

Thus, in devices of the invention presenting such dimensions, the width of the device in its folded position is substantially to one-third the total width of the screen once the sheet has been deployed and tensioned over the panels and the false back. The saving in space is thus particularly great, thus enabling the device to be integrated in a wide variety of configurations and in dwellings that are short of space. Furthermore, because of the automated displacement of the false back linked to the opening and closing of the panels, and because of spaces provided between the false back and the second panel, and between the two folded panels, the sheet 2 folds over without making any long-lasting fold marks therein. This constitutes a considerable advantage compared with all presently existing systems.

Because of the way the panels fold in front of the false back forming a configuration similar to that of a paper clip when seen in plan view, the total thickness of the device of the present invention is not very different from that of a plasma screen or a liquid crystal screen, screens of which type are often hung on a wall.

The format of the device, once folded, is quite close to that of a standard poster or of a picture, thus enabling the device to be shown off in all sorts of ways, in particular by using reproductions of works of art slid under a transparent glass or plastic facade, and also by adding finishing side veneers using precious wood such as burr walnut or elm, or strips of metal, such as brushed or polished aluminum.

Furthermore, unlike prior art devices with a roll-up screen, whether motor-driven or not, where one of the main defects is that the sheet is under low tension, and the tension decreases over time, the device of the present invention enables a high and constant level of tension to be maintained in the projection sheet, thus guaranteeing ideal projection conditions.

The device of the invention is particularly intended for use in the homes of people seeking to install a private home cinema projection system that is discreet and of pleasing appearance, based on a video projector and on a reflective projection sheet.

Nevertheless, it should be understood that the detailed description given purely to illustrate the subject matter of the invention does not in any way constitute a limitation.

Thus, the panels 3 and 4 may be hinged to the box 1 with a wide variety of types of hinge or with a wormscrew, as a replacement for the hinges 12 providing they close one in front of the other and leave space between them.

The resilient return system 7 for the false back 5 may comprise a series of springs connecting the rear surface of the false back to the back of the box 1 so as to urge the false back automatically towards the back of the box while the panels 3 and 4 are being closed.

Instead of using cables 8, the false back 5 could be connected to the two panels 3 and 4 of the box 1 by a system of connections constituted for example by sliders, a compass linkage, or hinged arms, such that the opening of the two panels by the user causes the false back 5 to advance until it lies properly in the plane of the two panels.

In another variant that is particularly advantageous, it is possible to replace the resilient return means 7 connecting the false back to the back of the box 1 and the attachment system 8 connecting the panels to the false back, by a single system made up of fine flexible resilient metal sheets, such as steel strips connecting the panels to the false back.

Instead of using wheels 21, the false back 5 could slide within the box 1, on rails, slideways, ball bearings, a resilient system, or any other mechanism.

The resilient tensioning system 6 for tensioning the sheet over each of the panels and the false back can be made using eyelets and elastic cords, or press studs.

The arms 10 connecting the box 1 to the panels 3 and 4 may be motor-driven and remotely controllable in order to simplify opening. Similarly, the rotary shaft 20 may be motor-driven and possibly remotely controlled in order to cause the device to pivot, and the stand 18 may be provided with a motor in order to enable the height of the device to be adjusted so as to match the surroundings and provide good viewing comfort.

Furthermore, the band 18 for protection and improving contrast can be constituted by a metal strip painted black and not placed directly on the sheet, but lying in front of it, e.g. being held by connection tabs that are secured to the panels, to the false back, or to the box.

The device as designed can be placed on a wall in an upright position so that the triptych opens horizontally, i.e. so that the panels open to the right and to the left, however it could equally well be placed in a prone position such that the panels open upwards or downwards.

The picture to which the present application refers could equally well be a work of art, such as an original painting or a reproduction, or a writing board, such as a greenboard for a classroom or a white board for a conference room or an amphitheater. This solution thus enables the device to be included in professional surroundings, e.g. in a meeting room provided with a video projector, with the device of the present invention then acting both as a projection sheet when it is in its deployed state and as a writing board when it is in its folded state.

A particularly advantageous variant of the device consists in hanging an mage display screen on the front face of the first panel. In non-limiting manner, the screen may be of the analog or digital type, e.g. a plasma screen, a liquid crystal display (LCD) screen, an organic light-emitting diode (LED) screen, or a carbon nanotube (CNT) screen, or using any other display technology.

The invention claimed is:

1. A device for folding a sheet, comprising:
   a wall decoration and a box placed behind the wall decoration;
   a device inside the box opening out to form a three-portion device comprising a first panel, a second panel, the first and second panels being hinged with the box so that the first and second panels close in front of one another, and a central false back that advances into alignment with the first and second panels when open and/or that reverses to the back of the box; and
   a sheet being tensioned over the first and second panels and the false back so that the sheet deploys and is tensioned when the first and second panels are open, and folds over into three portions without leaving any fold marks when the first and second panels are closed.

2. A device according to claim 1, in which the box includes a first side on which the first panel is secured, and a second side on which the second panel is secured, the first side being deeper than the second side.

3. A device according to claim 1 or claim 2, in which the second panel is narrower than the first panel so as to be capable of entering inside the box when closed.

4. A device according to claim 1, in which the first panel and the second panel are connected to the box via hinges spaced such that the first and second panels do not close in a common plane but rather one in front of the other, leaving an empty space between the first and second panels.

5. A device according to claim 1, further comprising means for facilitating opening and/or closing of at least one of the first and second panels.

6. A device according to claim 5, in which the means for facilitating opening and/or closing of the first and second panels comprise a hinged arm connecting each of the first and second panels to the box.

7. A device according to claim 1, in which the first and second panels and the false back each includes means for correcting their alignment so as to tension the sheet in a plane manner on the first and second panels and on the false back when the device is in a fully-open position.

8. A device according to claim 7, in which the alignment correcting means comprises battens of various thicknesses placed on respective perimeters of each of the first and second panels and/or of the false back.

9. A device according to claim 8, in which the first and second panels and the central false back, or their alignment-correcting battens, include fastening points for tensioning the sheet.

10. A device according to claim 1, further comprising a resilient return system such that the central false back over which a middle of the sheet is tensioned advances automatically when the first and second panels are open and reverses when the first and second panels are closed, an empty space being provided between the central false back and the second panel placed in front of it.

11. A device according to claim 10, in which the resilient return system includes a plurality of pour EPsprings connecting the central false back to the box.

12. A device according to claim 10, in which the resilient return system and attachment means are constituted by the sheet.

13. A device according to claim 1, further comprising a fastener system that connects the first and second panels to the false back so as to move the false back automatically as a function of the opening and the closing of the first and second panels.

14. A device according to claim 13, in which the fastener system comprises a cable.

15. A device according to claim 13, in which the fastener system comprises a fine flexible resilient metal sheet.

16. A device according to claim 1, in which the central false back includes wheels to facilitate advancing and reversing inside the box when the first and second panels are opened and closed.

17. A device according to claim 1, further comprising a fastener system for holding each of the first and second panels in the open position and/or the closed position.

18. A device according to claim 17, in which the fastener system comprises magnets fitted to one edge of each of the first and second panels and to corresponding edges of the box.

19. A device according to claim 1, in which the first panel includes a first rim such that the perimeter of the box as a whole is fully closed when the device is closed.

20. A device according to claim 19, in which the second panel includes a second rim substantially identical to the first rim of the first panel.

21. A device according to claim 1, further comprising a resilient tensioning system secured to the sheet so that the sheet is tensioned locally within the box on each of the first and second panels and on the central false back.

22. A device according to claim 21, further comprising covers fastened to an inside end of each of the first and second panels and juxtaposed on rims of the first and second panels so that the covers mask the resilient tensioning system for the sheet when the device is open.

23. A device according to claim 1, in which inside corners of the first and second panels are chamfered and covered by a protective system, to protect the sheet from any wear or rubbing.

24. A device according to claim 21, further comprising a peripheral band of color that contrasts with a color of the sheet, the band being secured to the front face of the sheet so as to locally reinforce the structure of the sheet, to accentuate the contrast of an image projected on the sheet, and to hide portions of the tensioning system.

25. A device according to claim 1, in which the wall decoration comprises at least one of the following: a frame, a poster cover, a picture, a mirror, or a board and is fastened on or constitutes the front face of the first panel so that the wall decoration constitutes or is supported by a decorative facade of the device as a whole when in the closed position.

26. A device according to claim 1, in which an image display screen is supported on the front face of the first panel.

27. A device according to claim 1, in which the rear of the box includes a fixing system enabling the box to be suspended from a wall.

28. A device according to claim 1, in which the box includes at its base a removable stand system enabling the device to be placed on a table or a horizontal support.

29. A device according to claim 1, in which the box includes a rear rotary shaft placed substantially in its middle and enabling the device to be hung from a wall and to be placed in a horizontal position, in a vertical position, or in any intermediate inclined position by turning the box about the shaft.

30. A device according to claim 29, in which the rotary shaft is motor-driven.

* * * * *